(12) United States Patent
Zhou et al.

(10) Patent No.: US 12,467,274 B2
(45) Date of Patent: Nov. 11, 2025

(54) SYSTEMS AND METHODS FOR FORMING MULTIPLE 3D STRUCTURES FROM A CIRCULARLY-PACKED NETWORK OF STRUCTURAL ELEMENTS

(71) Applicant: Toyota Motor Engineering & Manufacturing North America, Inc., Plano, TX (US)

(72) Inventors: Yuqing Zhou, Ann Arbor, MI (US); Masato Tanaka, Nagoya (JP); Yuyang Song, Ann Arbor, MI (US); Xianfeng David Gu, Plainview, NY (US); Shikui Chen, Stony Brook, NY (US); Zhou Zhao, Stony Brook, NY (US); Lingfeng Gao, East-Setauket, NY (US)

(73) Assignees: Toyota Motor Engineering & Manufacturing North America, Inc., Plano, TX (US); The Research Foundation for the State University of New York, Albany, NY (US)

( * ) Notice: Subject to any disclaimer, the term of this patent is extended or adjusted under 35 U.S.C. 154(b) by 250 days.

(21) Appl. No.: 18/449,293

(22) Filed: Aug. 14, 2023

(65) Prior Publication Data

US 2025/0059795 A1    Feb. 20, 2025

(51) Int. Cl.
*E04H 15/00*    (2006.01)
*E04H 15/20*    (2006.01)

(52) U.S. Cl.
CPC ....... *E04H 15/20* (2013.01); *E04H 2015/202* (2013.01)

(58) Field of Classification Search
CPC ......... E04H 15/00; E04H 15/06; E04H 15/20; E04H 2015/202; E04H 2015/204; E04H 15/44

See application file for complete search history.

(56) References Cited

U.S. PATENT DOCUMENTS

| 7,615,071 B2 | 11/2009 | Chobotov | |
| 8,652,602 B1 * | 2/2014 | Dolla | B29C 44/357 442/205 |

(Continued)

FOREIGN PATENT DOCUMENTS

WO    2017102568 A1    6/2017

OTHER PUBLICATIONS

Roovers et al. "Digital design of deployable scissor grids based on circle packing," Proceedings of IASS annual symposia. vol. 2015. No. 6. International Association for Shell and Spatial Structures (IASS), 2015.

(Continued)

*Primary Examiner* — Chi Q Nguyen
(74) *Attorney, Agent, or Firm* — Christopher G. Darrow; Darrow Mustafa PC

(57) ABSTRACT

Systems, methods, and other embodiments described herein relate to multiple three-dimensional (3D) structures formation from a network of circularly-packed structural elements. In one embodiment, a system includes a circularly-packed network of structural elements that form multiple 3D structures. Diameters of the structural elements define a shape of the 3D structures. The circularly-packed network is adaptable to form 1) a first 3D structure and 2) a second 3D structure with a different shape than the first 3D structure. The system also includes a set of joints that connect adjacent structural elements.

20 Claims, 5 Drawing Sheets

(56) References Cited

U.S. PATENT DOCUMENTS

| | | | |
|---|---|---|---|
| 10,422,148 B2 | 9/2019 | Kitagawa | |
| 10,850,406 B2* | 12/2020 | Lipton | B25J 15/12 |
| 11,352,504 B2* | 6/2022 | Takanohashi | C09C 1/3054 |
| 11,498,248 B2 | 11/2022 | Zeng et al. | |
| 11,712,637 B1* | 8/2023 | Hoffberg | F42B 10/64 |
| | | | 701/2 |
| 12,228,046 B2* | 2/2025 | Kibsey | B29C 64/153 |
| 2010/0118412 A1* | 5/2010 | Sanada | G02B 1/007 |
| | | | 428/402 |
| 2011/0041250 A1* | 2/2011 | Satou | A61G 5/1043 |
| | | | 5/654 |
| 2015/0300440 A1* | 10/2015 | Miller, Jr. | B64C 1/00 |
| | | | 700/282 |
| 2017/0009036 A1* | 1/2017 | Xie | B33Y 80/00 |
| 2018/0009257 A1* | 1/2018 | Bertoldi | C22C 19/05 |
| 2018/0264775 A1* | 9/2018 | Bertoldi | B05C 1/00 |
| 2024/0023970 A1* | 1/2024 | Connor | A61B 17/12177 |

OTHER PUBLICATIONS

Maden et al. "Design of reconfigurable doubly-curved canopy structure," Proceedings of the ICSA (2013): 24-26.

Konakovic-Lukovic et al. "Rapid deployment of curved surfaces via programmable auxetics." ACM Transactions on Graphics (TOG) 37.4 (2018): 1-13.

Schiftner et al. "Packing circles and spheres on surfaces." ACM SIGGRAPH Asia 2009 papers. 2009. 1-8.

Fenci et al. "Deployable structures classification: A review." International Journal of Space Structures 32.2 (2017): 112-130.

Del Grosso et al. "Deployable structures." Advances in science and technology. vol. 83. Trans Tech Publications Ltd, 2013.

Tahouni et al. "NURBSforms: A modular shape-changing interface for prototyping curved surfaces." Proceedings of the Fourteenth International Conference on Tangible, Embedded, and Embodied Interaction. 2020.

Sinn et al. "Design and development of a deployable self-inflating adaptive membrane." 53rd AIAA/ASME/ASCE/AHS/ASC Structures, Structural Dynamics and Materials Conference 20th AIAA/ASME/AHS Adaptive Structures Conference 14th AIAA. 2012.

Charalambos Gantes "A design methodology for deployable structures." Diss. Massachusetts Institute of Technology, 1991.

Gantes et al. "Structural analysis and design of deployable structures." Computers & Structures 32.3-4 (1989): 661-669.

Amy S. Verge. "Rapidly deployable structures in collective protection systems." Army Soldier and Biological Chemical Command Natick MA, 2006.

Mazur et al. "Additively Manufactured Hierarchical Auxetic Mechanical Metamaterials." Materials. 2022. 15:5600.

Meena et al. "A new auxetic structure with significantly reduced stress concentration effects." Materials & Design, vol. 173. Jul. 2019.

Santulli et al. "Study and development of concepts of auxetic structures in bio-inspired design." International Journal of Sustainable Design, vol. 3, issue 1. 2016.

Narvaez-Rodriguez et al. "Lightweight Conical Components for Rotational Parabolic Domes." Advances in Architectural Geometry 2016. p. 378. 2016.

* cited by examiner

SYSTEMS AND METHODS FOR FORMING MULTIPLE 3D STRUCTURES FROM A CIRCULARLY-PACKED NETWORK OF STRUCTURAL ELEMENTS

TECHNICAL FIELD

The subject matter described herein relates, in general, to three-dimensional shell structures and, more particularly, to forming multiple (e.g., two or more) three-dimensional shell structures from a network of circularly-packed structural elements.

BACKGROUND

A deployable structure is a structure that can transition from one geometric form to another. Deployable structures are used in various applications, including buildings and edifices, biomedical devices, and solar panels for spacecraft, among others. In some examples, these structures are rapidly deployable, taking shape within minutes.

For example, homes may be destroyed or become otherwise uninhabitable due to natural disasters. In these situations, emergency relief organizations dispatch rapidly-deployable housing structures to provide shelter for displaced citizens and infrastructure to support the provision of relief and medical attention. These structures may take various forms, including inflatable shells that are initially flat and inflated to form a shell structure.

As another example, deployable structures may be used in soft robotics or inflatable robotic manipulation where a soft surface, rather than a hard surface, is used to grasp or otherwise manipulate objects. A rigid manipulation surface may damage fragile objects. A soft manipulation surface ensures that a fragile object is not damaged during manipulation.

In general, further technological innovation associated with deployable structures will increase the breadth of their use throughout society and their efficient implementation. Moreover, expanded deployable structure capability enlarges the fields of potential use to include those that were previously infeasible.

SUMMARY

In one embodiment, example systems and methods relate to a manner of improving the formation of three-dimensional (3D) shell structures.

In one embodiment, a system for forming multiple 3D shell structures from a network of circularly-packed structural elements is disclosed. The system includes a circularly-packed network of structural elements that form multiple 3D structures. Diameters of the structural elements define the shape of the 3D structures. The circularly-packed network is adaptable to form 1) a first 3D structure and 2) a second 3D structure with a different shape than the first 3D structure. The system also includes a set of joints that connect adjacent structural elements.

In one embodiment, a system includes a circularly-packed network of structural elements that form multiple 3D structures. Diameters of the structural elements define the shape of the 3D structures. In a first configuration, the circularly-packed network of structural elements forms a first 3D structure. In a second configuration, the circularly-packed network of structural elements forms a second 3D structure having a different shape than the first 3D structure. The system also includes a set of joints that connect adjacent structural elements.

In one embodiment, a method for generating multiple 3D structures from a single network of circle structure elements is disclosed. In one embodiment, the method includes identifying a first 3D structure for a circularly-packed network of structural elements. Diameters of the structural elements define a shape of the first 3D structure. The method also includes identifying a second 3D structure for the circularly-packed network of structural elements. The second 3D structure having a different shape than the first 3D structure. The method also includes changing a configuration of the circularly-packed network to morph the first 3D structure into the second 3D structure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
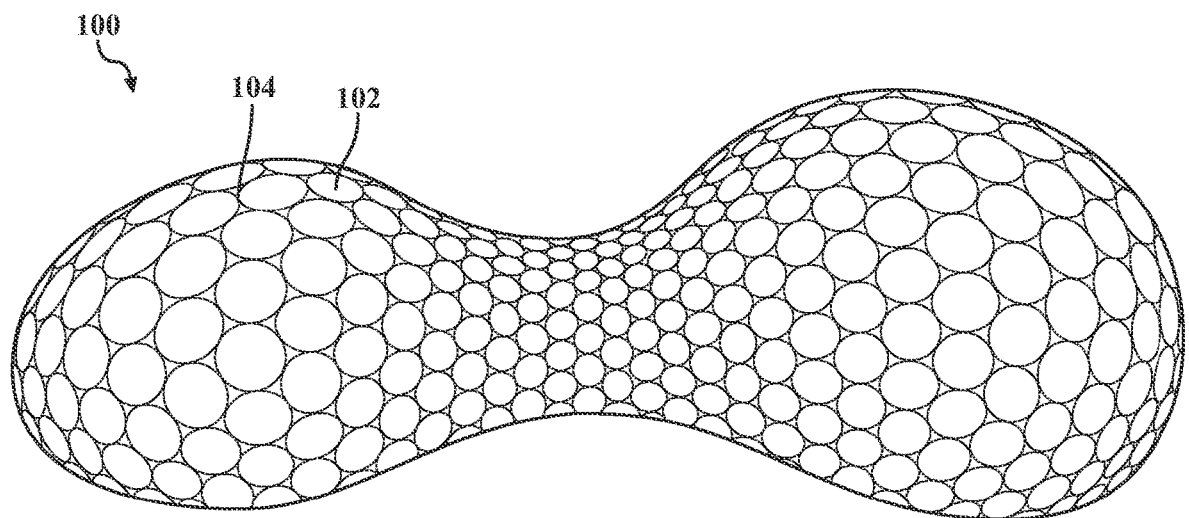
FIGS. 1A and 1B depict one embodiment of a system associated with forming multiple 3D structures.

Systems, methods, and other embodiments associated with improving the deployment of 3D structures are disclosed herein, whether such deployable structures are used as on-site structures/shelters or inflatable robotic manipulators. A deployable structure is a structure that can transition from one geometric form to another. Deployable structures may transform from a relatively planar configuration to a stable, expanded 3D form that can carry a load or provide an interior volume. The structure deployment may be rapid, occurring within a matter of minutes.

Deployable structures may be used as edifices. For example, homes may be destroyed or become otherwise uninhabitable due to natural disasters. In these situations, emergency relief organizations may dispatch rapidly-deployable structures to provide shelter for displaced citizens or cover emergency relief personnel and relief equipment.

As another example, deployable structures may be used in soft robotics or inflatable robotic manipulation where a soft surface, rather than a hard surface, is used to grasp or otherwise manipulate objects. A rigid manipulation surface may damage a fragile object. A soft manipulation surface ensures that a fragile object is not damaged during handling.

While such structures undoubtedly benefit users, certain advancements may further increase their implementation capabilities. For example, many deployable structures, such as inflatable structures, deploy to form a single target 3D structure. That is, general deployable structures exhibit a single-stage shape change from a flat structure to a single 3D structure. However, different situations warrant different 3D structure forms. For example, a low-ceiling building with a particular profile may be desired in one situation. In another situation, a building with a higher ceiling may be desired. Two separate deployable structures would be required to construct the two different buildings. In another example, it may be desirable to change a 3D structure shape based on a particular application. A single traditional deployable structure would not be able to accommodate the differently-shaped structures as such cannot accommodate multiple 3D deployed structures.

Accordingly, the present specification describes a system where multiple differently-shaped 3D structures can be deployed from a single network of structural elements. Specifically, the specification describes a network of structural elements that can be deployed to different 3D geometries. The system includes many planar circles with variable sizes. By varying circle radii, different freeform 3D surfaces can be formed. Note that in the present specification, particular reference may be made to two 3D structures that can be formed from a single network of structural elements. However, in some examples, more than two differently-shaped 3D structures can be deployed from a single network of structural elements.

In one example, the system includes a loosely-connected network of circular rings. The radius of each ring is adjustable. The 3D structure is formed when the system is in a fully stressed state (e.g., via internal inflation). The diameter of the rings is adjustable and occurs when the structure is deflated. As the diameters of different rings are changed, a different 3D structure is generated upon re-inflation.

In another example, the system includes a rigidly-connected network of circular disks with sizes selected from a prescribed discrete set. The 3D structure is formed as the circular disks are rigidly connected to one another. Shape morphing from one 3D structure to another is realized by disassembling and re-assembling the circular disks.

In this way, the disclosed systems, methods, and other embodiments improve deployable structures by providing differently-shaped 3D structures from a single circularly-packed network of structural elements. That is, different radii and radii adjustments lead to different geometric 3D surface shapes. As a result, the present specification describes a single network of circularly-packed structural elements that can be morphed into different 3D shell structures. Such a system may be used in a variety of fields, including 1) inflatable robotic manipulation, 2) large shell structure construction on site (on the fly) with case of material transportation, and 3) adaptive shelters with the convenience of on-site repurposing.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the system is implemented to perform methods and other functions as disclosed herein relating to improving deployable structure generation.

Figure 1B:
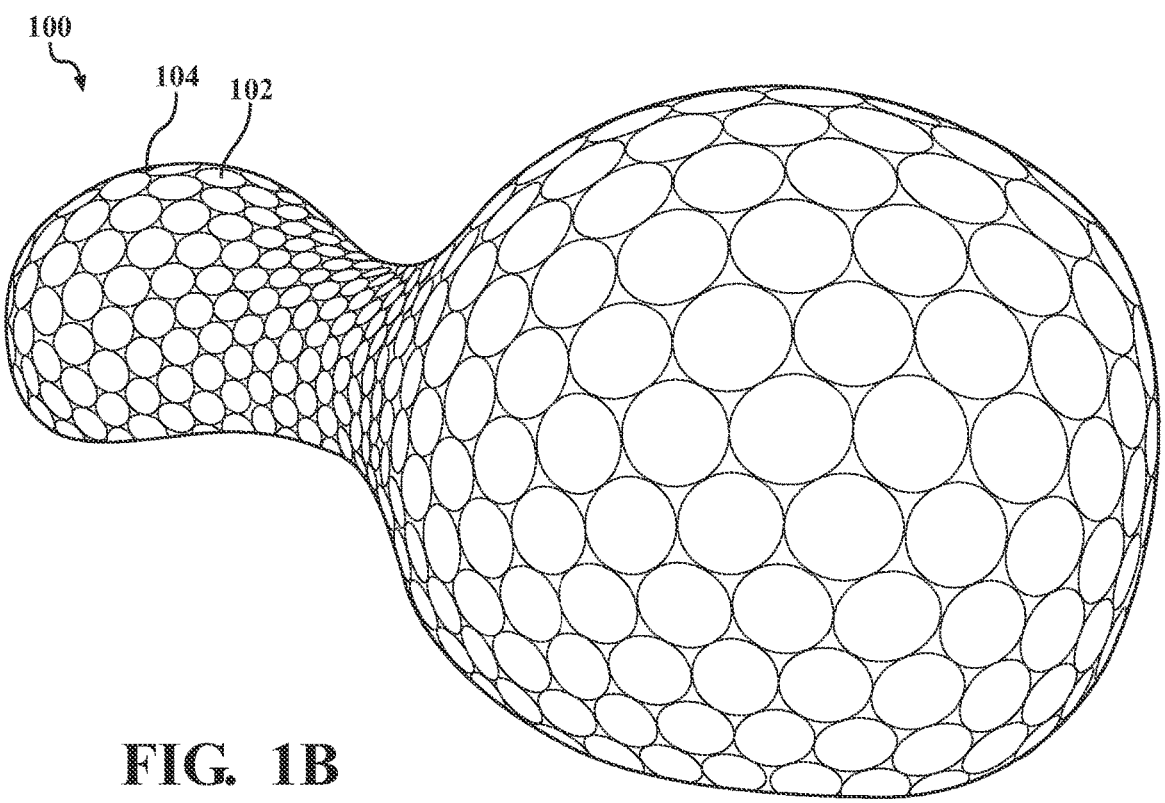

FIGS. 1A and 1B depict one embodiment of a system 100 associated with forming multiple 3D structures. The system 100 includes a circularly-packed network of structural elements 102. For simplicity, FIGS. 1A and 1B identify a single instance of a structural element 102 identified with a reference number. A circularly-packed network refers to an arrangement of the structural elements 102 across a surface such that there is no overlapping of structural elements 102 across the surface.

As described above, the circularly-packed network of structural elements 102 is adaptable to form different structures. Specifically, FIG. 1A depicts a first 3D structure formed from a circularly-packed network of structural elements 102, while FIG. 1B depicts a second 3D structure formed from the circularly-packed network of structural elements 102. That is, the circularly-packed network has different configurations. In a first configuration, the structural elements 102 form a first 3D structure. In a second configuration, the structural elements 102 form a second 3D structure. Again, while FIGS. 1A and 1B depict two 3D structures formed from a circularly-packed network of structural elements 102; it will be noted that the same circularly-packed network of structural elements 102 may form additional 3D structures, including a third and a fourth and so on. As such, the present circularly-packed network of structural elements 102 may be configured in any variety of ways such that when deployed, any variety of 3D structures may be constructed.

Diameters of the structural elements 102 define a shape of the resulting 3D structure. The 3D structure shape/structural element diameter relationship is depicted in FIGS. 1A and 1B, where structural elements 102 with smaller diameters result in smaller cross-sectional regions of the respective 3D structures, while structural elements 102 with larger diameters result in larger cross-sectional regions of the respective 3D structures. As such, particular shapes for the 3D structures may be achieved by selecting particular diameters for the structural elements 102 that make up the 3D structure.

In an example, for a given 3D structure, a diameter of at least a first structural element 102 differs from that of a second structural element 102. That is, the diameters of the structural elements 102 that make up the 3D structures are non-uniform. Such non-uniformity of the structural elements 102 allows for the formation of 3D structures with complex profiles.

As the diameters of the structural elements 102 define the shape of the 3D structure, differently-shaped 3D structures may be formed by changing the diameter of the individual structural elements 102 that form the network. For example, by enlarging the diameters of the structural elements that form the right-hand bulb region of the first 3D structure depicted in FIG. 1A, the right-hand bulb region is enlarged, as depicted in FIG. 1B. Changing the shape of the 3D structure is manifested in different ways depending on the type of structural element 102. For example, when the structural elements 102 are adjustable diameter rings, the adaptation includes changing the diameter of at least one of the rings. Additional detail regarding ring diameter adjustment is provided below in connection with FIGS. 2A and 2B. By comparison, when the structural elements 102 are rigid disks, the adaptation includes swapping out a disk with one diameter for a disk having a different diameter. Additional detail regarding disk adjustment is provided below in connection with FIGS. 3A and 3B.

The 3D structures themselves may also take a variety of forms, which forms are also dependent upon the type of structural element 102. For example, when the structural elements 102 are rings, the 3D structures are soft shell structures, based on 1) the loosely-connected joints and 2) an inflatable structure underlying the rings, which inflatable structure inflates to stress the ring-based circularly-packed network. When the structural elements are rigid disks, the 3D structures are rigid shell structures based on 1) the rigid disks and 2) the rigid joints between adjacent disks.

The system 100 also includes a set of joints 104 that connect adjacent structural elements 102. As with the structural elements 102, FIGS. 1A and 1B identify a single instance of a joint 104 with a reference number. However, each structural element 102 is connected via joint 104 to at least one adjacent structural element 102. In some examples, each structural element 102 is connected to each adjacent structural element 102. For example, a single structural element 102 in FIGS. 1A and 1B may be joined to the six structural elements 102 surrounding it. In other examples, a single structural element 102 may be connected to less than all of the adjacent structural elements 102.

The joints 104 may be of various types, and like the form of the 3D structure, the type of joint 104 is based on the type of structural element 102. For example, when the structural elements 102 are rings, the joints 104 are loosely-connected, providing the rings with multiple degrees of freedom of movement relative to one another. Were the ring-based joints 104 rigid, allowing no degrees of freedom of movement, the circularly-packed network of rings would not be able to rest in a planar configuration. The loosely-connected type of joint 104 may also take various forms with additional detail regarding the forms described below in connection with FIGS. 2A and 2B.

By comparison, when the structural elements 102 are rigid disks, the joints 104 are rigidly connected to support the heavier disks. That is, disks connected by a rigid joint have no degrees of freedom of movement relative to one another. Were the disk-based joints 104 loosely-connected, the 3D structure would not be able to maintain its shape and would buckle. The rigidly-connected type of joint 104 may also take various forms with additional detail regarding the different forms described below in connection with FIGS. 3A and 3B.

As described above, the system 100 is implementable in various fields, including inflatable robotic manipulation, 2) on-the-fly large shell structure construction on site, and 3) adaptive shelters with the convenience of on-site repurposing. The form of the structural elements 102 may be based on the field and application. For example, as described above, robots may grasp objects. Were a 3D structure formed of rigid disks and rigid connections, a firm grip force from a rigid robotic structure may damage the object and objects in the vicinity of the robot. In this example, a soft-shell structure may be used, such as that formed from adjustable diameter rings and an underlying inflatable structure. The soft-shelled structure deforms when grasping the object. That is, a soft-shell structure provides a firm but undamaging grip for a robotic manipulation device. In this example, the adjustable nature of the circularly-packed network allows different robotic manipulation profiles to be achieved by simply adjusting the diameters of the rings that make up the 3D structure.

Soft shell structures formed by diameter adjustable rings may also be used for edifice morphing. For example, it may be desirable for an edifice to have a low ceiling in one instance, for example, to host an event with a few people. In another instance and at that same location, it may be desirable to construct a more spacious edifice with a higher ceiling, for example, to host an event with more people. This larger edifice may be formed using the same network of rings by enlarging the diameter of the rings that make up the structure.

In another example, a transportable rigid 3D shell structure may be desirable. For example, a mobile relief station provides great utility as it is moveable from location to location. As such, it is desirable for such to be easily assembled and disassembled for transport. In this example, rigid disks that can easily be disassembled and stacked provide a compact transportation footprint and are easily moved from site to site. The 3D structure is then easily re-assembled by joining the structural elements 102 via the rigidly-connected joints 104. As such, a firm and robust structure is made transportable via easily disassembled rigid disks. Moreover, the shape of the structure is interchangeable by assembling different sets of disks, the different sets including disks with different diameters. While particular reference is made to particular example applications, the system 100, as described herein, may be used in various applications.

Figure 2A:
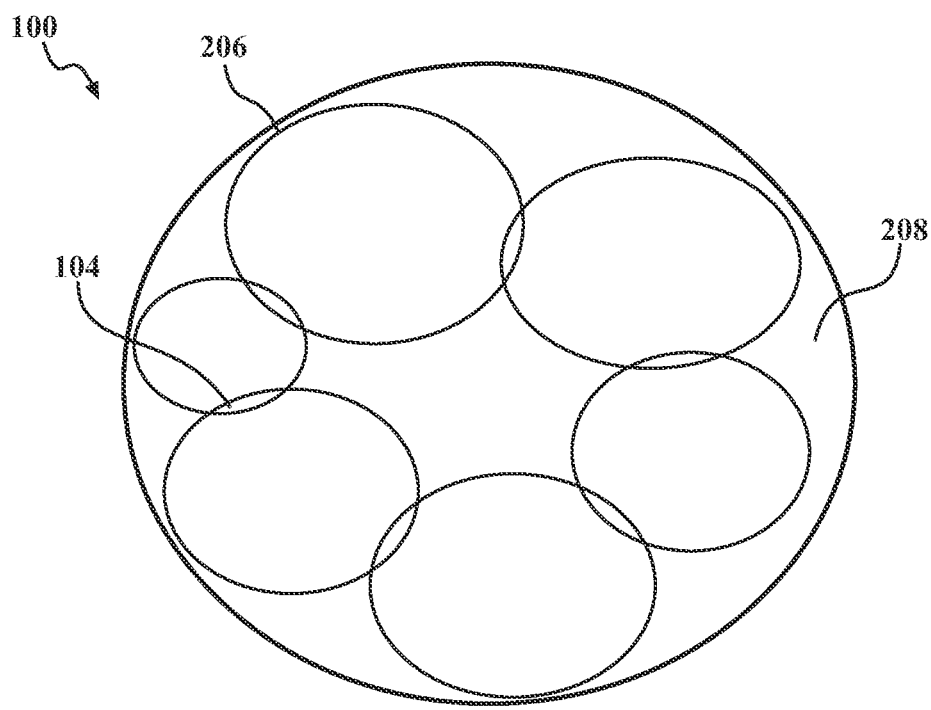
FIGS. 2A and 2B depict one embodiment of a system associated with forming multiple 3D structures with ring structural elements.
Figure 2B:
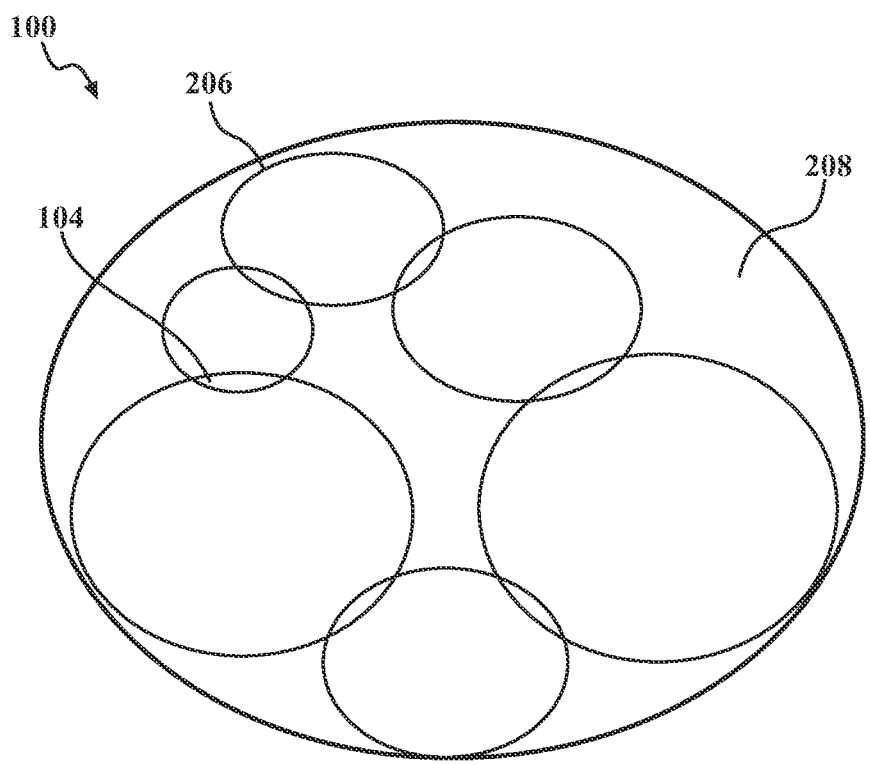

FIGS. 2A and 2B depict one embodiment of a system 100 associated with forming multiple 3D structures with ring structural elements 102. That is, in the example depicted in FIGS. 2A and 2B, the structural elements 102 are rings 206. For simplicity, a single instance of a ring 206 and a joint 104 are indicated by reference numbers in FIGS. 2A and 2B.

The rings 206 may be formed of any material, including metal, a polymer, or any other type of rigid or flexible material. As described above, the diameters of the rings 206 determine the shape of the 3D structure. Accordingly, a diameter of a ring 206 is adjustable to morph the first 3D structure into the second 3D structure, third 3D structure, etc. Specifically, as depicted in FIG. 2A, the rings 206 have specific diameters such that a first 3D structure would result when inflated. The same rings 206 having different diameters as depicted in FIG. 2B, when inflated, form a second 3D structure that has a different shape than the first 3D structure. That is, in the example depicted in FIGS. 2A and 2B, a single set of rings 206 are used to form multiple 3D structures, with the different structures being formed by altering the diameter of the individual rings 206.

A multi-diameter ring 206 may take a variety of forms. For example, the rings 206 may be formed of an aluminum, or other flexible material, strip with perforations along a length dimension. The flexible strip may be formed into the shape of a ring 206 with an attachment mechanism, such as a bolt, inserted through aligned perforations to secure the ring shape. In this example, adjusting a diameter of a ring 206 includes the removal of the bolt and reattaching the bolt following re-shaping of the ring 206.

In another example, a flexible strip, such as an aluminum or nylon strip, may have an integrated ratchet structure on its length dimension. An end piece of the flexible strip may include a pawl through which the ratchet structure passes. When engaged, the pawl locks against the ratchet to prevent re-sizing of the ring 206. In this example, adjusting the diameter of the ring 206 includes disengaging the pawl from the ratchet structure, repositioning the strip, and re-engaging the pawl with the ratchet structure.

As yet another example, the strip may be formed into a ring shape and held by a clamp that holds the strip in a circular shape. In this example, adjusting a diameter of the ring 206 includes releasing the clamp, repositioning the strip, and re-tightening the clamp across the repositioned strip. While particular types of adjustable rings 206 are described herein, the rings 206 may implement various mechanisms to provide an adjustable diameter ring 206.

As described above, the set of joints 104 in this example are loosely-connected joints 104 that allow adjacent rings 206 multiple degrees of freedom of movement relative to one another. This joint 104, like the rings 206 themselves, may take a variety of forms. For example, individual rings 206 may interlock with one another. As another example, the joint 104 may be an elastic joint, such as an elastic band that wraps around adjacent rings 206. In either example, adjacent rings 206 move relative to one another. While particular reference is made to particular loosely-connected joints 104, different types of loosely-connected joints 104 may be implemented that allow the rings 206 to move relative to one another while remaining connected to one another.

As described below, a ring-based system 100 may exist in either of two states. In an unstressed state, the circularly-packed network of rings 206 forms a two-dimensional (2D) planar structure as depicted in FIGS. 2A and 2B. In a stressed state, the circularly-packed network of rings 206 forms a 3D structure (e.g., either the first 3D structure or a second 3D structure), as exemplified in FIGS. 1A and 1B. A loosely-connected system and the relative motion provided therein (rather than a rigidly connected system that prevents relative motion) allows the rings 206 to transition from the unstressed to the stressed state. Again, while FIGS. 2A and 2B depict two different configurations of the circularly-packed network of rings 206, the ring diameters may be adjusted in additional ways to generate additional 3D structures upon deployment.

As described above, a ring-based system 100 produces a soft shell structure. The interlocked rings 206 provide an external frame, while another component, such as an inflatable structure 208 underlying the circularly-packed network, provides the interior volume. The inflatable structure 208 transitions the circularly-packed network of rings 206 from the unstressed state to the stressed state. In an example, one inflatable structure 208 is used to form the different 3D structures. That is, the diameters of the rings 206 define the shape of the resultant 3D structure, not the form of the inflatable structure 208. In this example, the rings 206 sit on, but are not adhered to, the inflatable structure 208. The rings 206 move relative to the inflatable structure 208. Specifically, as the inflatable structure 208 is inflated, the rings 206 slide across the surface of the inflatable structure 208 to a stressed state. The inflation moves the rings 206 outward and upward away from each other to form a 3D structure.

In an example, the first 3D structure may be morphed into the second 3D structure without disassembling the 3D structure. That is, while in a stressed state, i.e., via internal inflation, the diameter of the rings 206 may be adjusted as described above. As such, a 3D structure shape may be changed on-the-fly by adjusting the diameters of the rings 206 of the circularly-packed network.

Figure 3A:
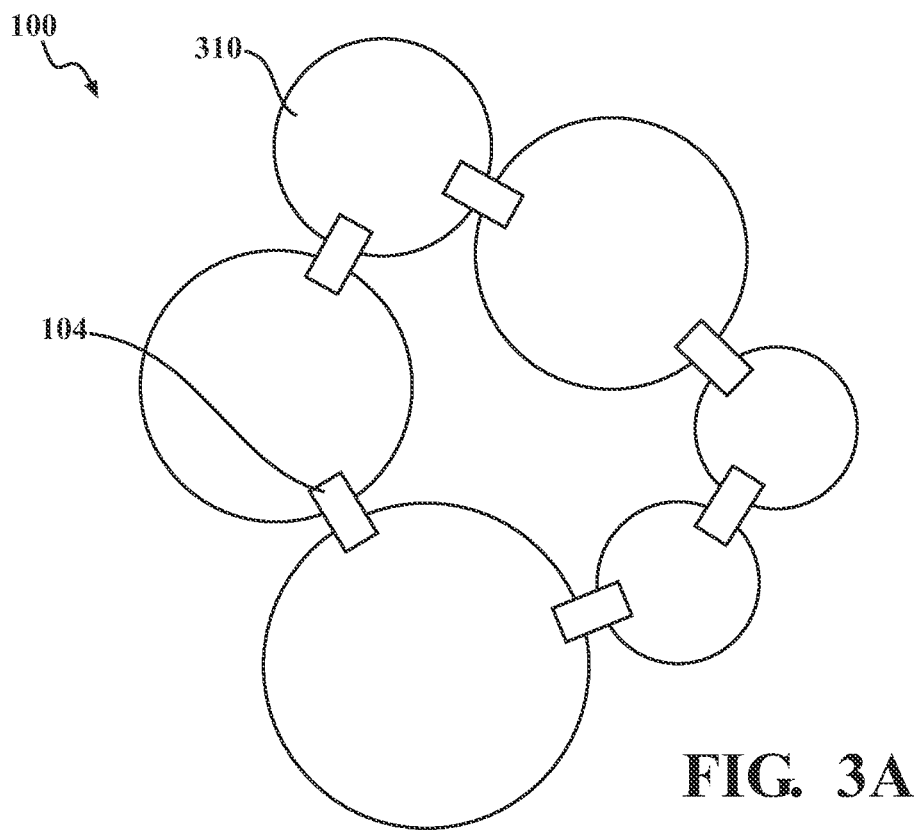
FIGS. 3A and 3B depict one embodiment of a system associated with forming multiple 3D structures with disk structural elements.
Figure 3B:
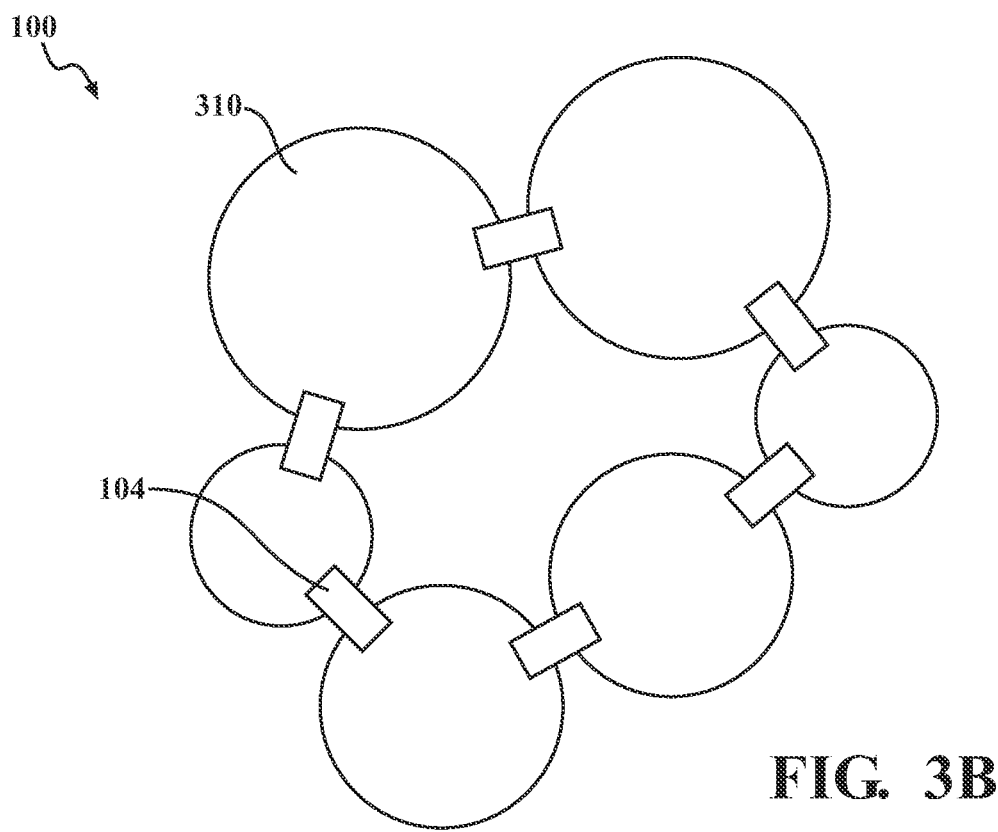

FIGS. 3A and 3B depict one embodiment of a system 100 associated with forming multiple 3D structures with disk structural elements 102. That is, in the example depicted in FIGS. 3A and 3B, the structural elements 102 are rigid disks 310. For simplicity, a single instance of a rigid disk 310 and a joint 104 are indicated by reference numbers in FIGS. 3A and 3B.

The disks 310 may be formed of any material, including metal, concrete, a polymer, or any other type of rigid material. As described above, the diameters of the disks 310 determine the shape of the 3D structure. To morph the first 3D structure into the second 3D structure, the set of disks 310 that form the circularly-packed network are re-arranged. Specifically, as depicted in FIG. 3A, in a first arrangement, the circularly-packed network includes a first set of rigid disks that would produce a first 3D structure. In a second arrangement, as depicted in FIG. 3B, the circularly-packed network includes a second set of rigid disks that would produce a differently-shaped 3D structure. The first and second sets of disks differ in that a diameter of at least a first disk of the first set differs from a diameter of at least a second disk in the second set. Disks 310 are selected to form a particular 3D structure based on their diameter. That is, in the example depicted in FIGS. 3A and 3B, different sets of disks 310 are used to form multiple 3D structures.

As described above, the set of joints 104 that connect circular disks 310 are rigid joints. When formed into the 3D structure, the disks 310 do not move relative to one another. The rigid joints 104 allow the disks 310 to be stable without additional support. The friction force of adjacent disks 310 and the resistance at the joint between adjacent disks 310 provide the structural strength. Were the disks 310 connected by loosely-connected joints 104, the 3D structure would not hold form independently and would instead necessitate additional framework elements to stabilize the structure.

In an example, the disks 310 may have a trapezoidal cross-sectional area. Specifically, the circumference of an exterior surface of the disk 310, i.e., the surface facing away from the interior volume of the 3D structure, may be larger than the circumference of an interior surface of the disk 310, i.e., the surface facing towards the interior volume of the 3D structure. In this way, an interface between adjacent disks 310 prevents the 3D structure from collapsing.

The rigid joints 104 may take a variety of forms. For example, the disks 310 may be joined via cable ties. In another example, the disks 310 may be joined via screws, bolts, straps, adhesive, or another type of rigid attachment mechanism. While particular reference is made to particular rigid joints 104, different types of rigid joints 104 that connect the disks 310 while preventing relative movement may be implemented.

As described above, a disk-based system 100 results in a rigid shell structure. The disks 310 provide both the external frame for the rigid shell structure and the interior volume. In some examples, fabric or other material may be draped over the disk-based rigid shell structure to enclose gaps between adjacent structural elements 102.

In this example, morphing the first 3D structure into the second 3D structure includes disassembling the circularly-packed network and replacing disks 310 of the first set with disks 310 of the second set. Such a system allows for the facile deconstruction and construction of structures such as shelters. For example, a set of discrete disks 310 may be loaded into containers and transported to a first site where a 3D structure may be constructed by joining the disks 310 in a particular fashion. At some point in time, the disks 310 may be disassembled and again loaded into containers for transport to a new location and re-constructed, either in the same 3D structure using the same arrangement of disks 310 or in a different 3D structure by using a different arrangement of disks 310. As such, the disk-based system 100 provides efficiently relocatable temporary or semi-permanent structures and does not rely on specialized equipment such as electrical power to provide an interior volume. Again, while FIGS. 3A and 3B depict two different configurations of disks 310, additional configurations of disks 310 may be used to generate additional 3D structures upon deployment.

Figure 4:
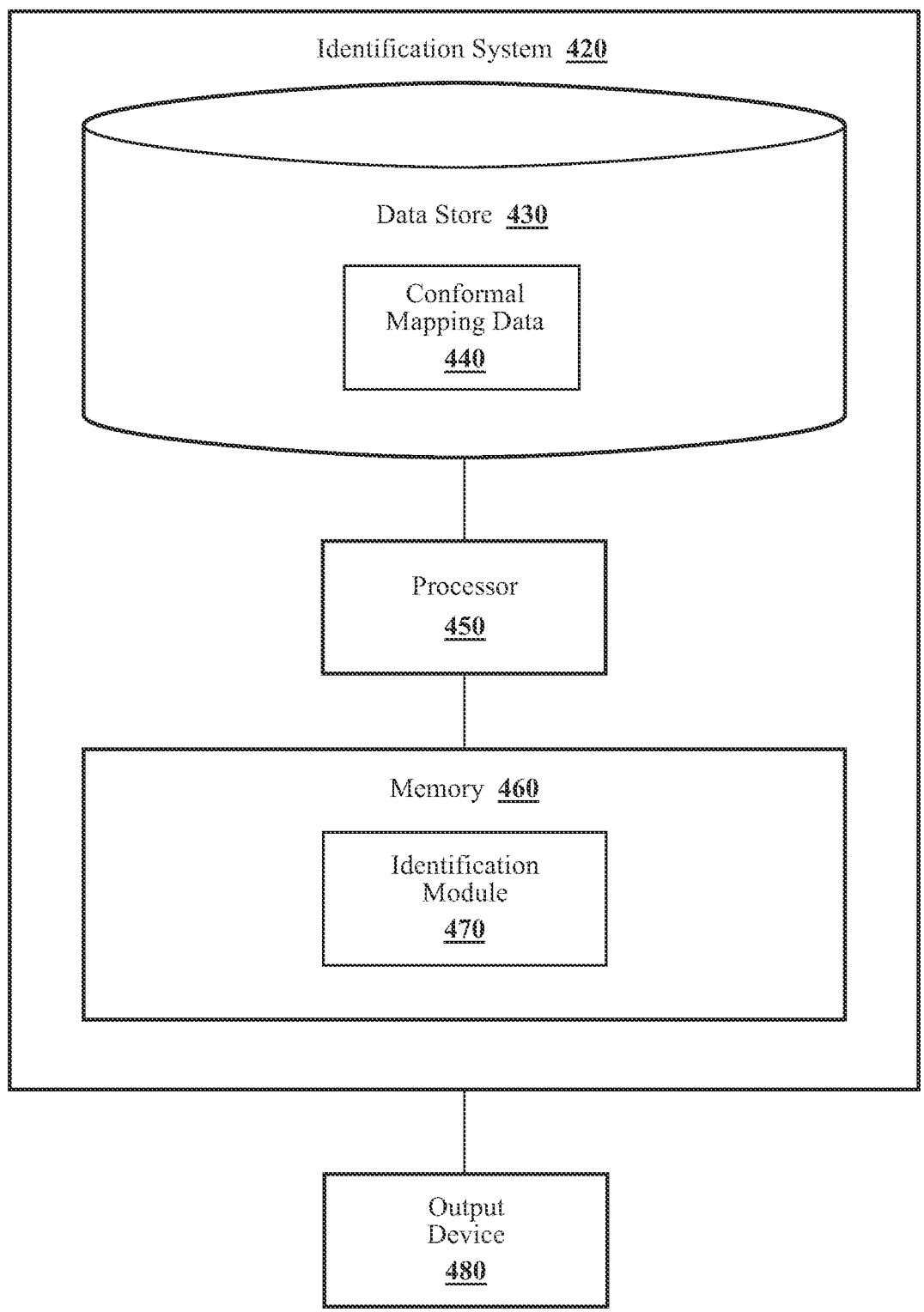
FIG. 4 illustrates one embodiment of an identification system that is associated with forming multiple 3D structures.

FIG. 4 illustrates one embodiment of an identification system 420 that is associated with forming multiple 3D structures. In one example, the operations of identifying 3D structures to form and identifying the structural elements 102 that will form the 3D structures may be performed by an identification system. The identification system 420 is shown as including a processor 450. In one embodiment, the identification system 420 includes a memory 460 that stores an identification module 470. The memory 460 is a random-access memory (RAM), read-only memory (ROM), a hard-disk drive, a flash memory, or another suitable memory for storing the identification module 470. The identification module 470 is, for example, computer-readable instructions that when executed by the processor 450 cause the processor 450 to perform the various functions disclosed herein.

Moreover, in one embodiment, the identification system 420 includes the data store 430. The data store 430 is, in one embodiment, an electronic data structure stored in the memory 460 or another data storage device that is configured with routines that can be executed by the processor 450 for analyzing stored data, providing stored data, organizing stored data, and so on. Thus, in one embodiment, the data store 430 stores data, such as conformal mapping data 440, used by the identification module 470 in executing various functions.

The data store 430 can be comprised of volatile and/or non-volatile memory. Examples of memory that may form the data store 430 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 430 is a component of the processor(s) 450. In general, the data store 430 is operatively connected to the processor(s) 450 for use thereby. The term "operatively connected," as used throughout this description, can include direct or indirect connections, including connections without direct physical contact.

Figure 5:
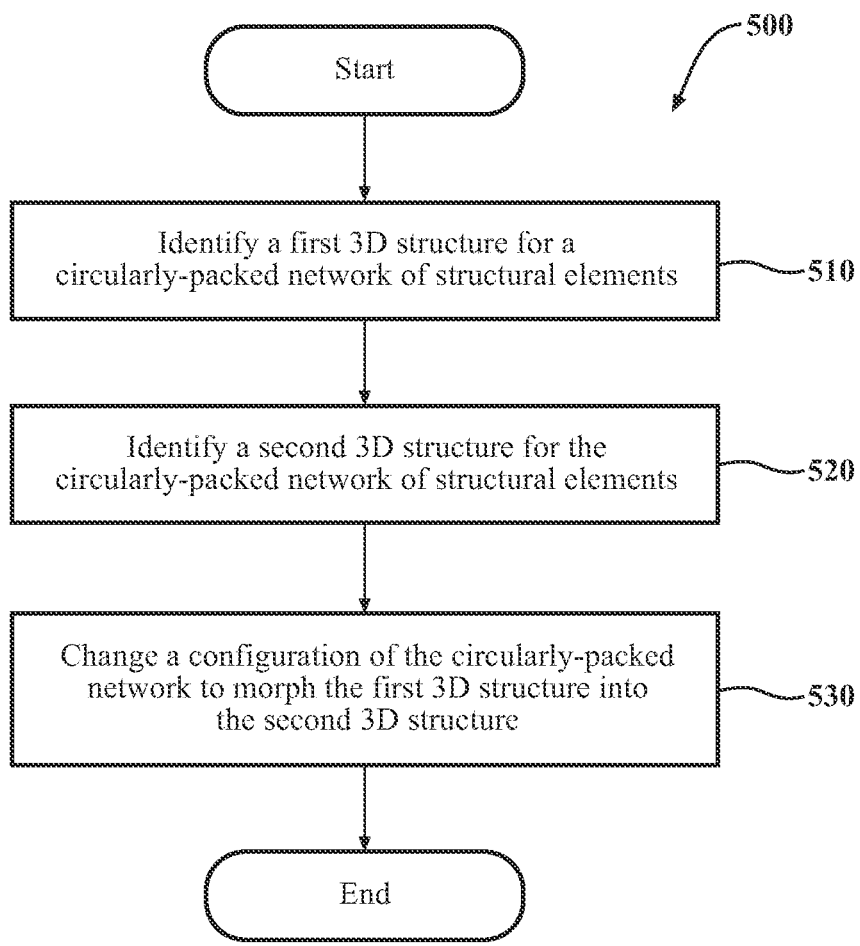
FIG. 5 illustrates a flowchart for one embodiment of a method that is associated with forming multiple 3D structures.

Additional aspects of multiple 3D structure deployment will be discussed in relation to FIG. 5. FIG. 5 illustrates a flowchart of a method 500 that is associated with forming multiple 3D structures. The method 500 will be described from the viewpoint of the identification system 420. However, it should be understood that this is just one example of implementing the method 500. While method 500 is discussed in combination with the identification system 420, it should be appreciated that the method 500 is not limited to being implemented within the identification system 420, but is instead one example of a system that may implement the method 500.

At 510, the instructions within the identification module 470, when executed by the processor 450, cause the processor 450 to identify a first 3D structure for a circularly-packed network of structural elements 102. As described above, the diameters of structural elements 102 define the shape of the first 3D structure. As such, identifying the first 3D structure may include designating a desired shape for the first 3D structure, which is defined by any number of criteria, including intended use, geographic considerations, transport considerations, and the like.

Similarly, at 520, the instructions within the identification module 470, when executed by the processor 450, cause the processor 450 to identify a second 3D structure for the circularly-packed network of structural elements 102. As described above, the second 3D structure has a different shape than the first 3D structure such that the circularly-packed network of structural elements 102 is adaptable to form not one but at least two 3D structures.

In addition to identifying the 3D structures to be formed, the method 500 includes identifying the diameters for the various structural elements 102 in the circularly-packed network. In a specific example, using the conformal mapping data 440, the identification module 470 causes the processor 450 to identify the structural element 102 diameters that would produce the first 3D structure. Similarly, the identification module 470 causes the processor 450 to use the conformal mapping data 440 to identify the structural element 102 diameters that would produce the second 3D structure. In general, conformal mapping identifies a given surface, e.g., the surface of the 3D structure, and identifies a strategy for packing various circular structural elements 102 across the surface. That is, the identification system 420 may model the 3D structures. Based on the models, the identification module 470 identifies how many structural elements 102 are needed, the diameters of those structural elements 102, and the relative positioning of the structural elements 102 to form a particular 3D structure.

At 530, the configuration of the circularly-packed network is changed to morph the first 3D structure into the second 3d structure. In the example where the structural elements 102 are loosely-connected rings 206, this may include identifying by the identification system 420 how to adjust the diameters of individually adjustable rings 206 to convert the first 3D structure into the second 3D structure. In the example where the structural elements are rigidly-connected disks 310, this may include identifying which disks 310 to swap out for others to convert the first 3D structure into the second 3D structure. This information may be provided by an output device 480 that is in communication with the processor 450 of the identification system 420.

When the structural elements 102 are loosely-connected rings 206, changing the configuration of the circularly-packed network includes placing the circularly-packed network to an unstressed state, for example by deflating an inflatable structure 208 underlying the circularly-packed network. An inflator (not shown) may be actuated by identification system 420. Following deflation, the diameter of one, and potentially more, rings 206 are adjusted as described above. Lastly, the circularly-packed network is re-stressed, for example by re-inflating the inflatable structure 208. As described above, when loosely-connected rings 206 are implemented, the transition from the first 3D structure to the second 3D structure occurs without disassembling the circularly-packed network.

When the structural elements 102 are rigidly-connected disks 310, changing the configuration of the circularly-packed network includes exchanging at least a first rigidly-connected disk 310 for a second rigidly-connected disk 310 with a different diameter. As such, the present system 100 provides a circularly-packed network of structural elements 102 that are reconfigurable to form different 3D structures with different shapes.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a circularly-packed network of structural elements that form multiple three-dimensional (3D) structures, diameters of the structural elements define a shape of the 3D structures and the circularly-packed network is adaptable to form:
a first 3D structure; and
a second 3D structure with a different shape than the first 3D structure; and
a set of joints that connect adjacent structural elements.

2. The system of claim 1, wherein the first 3D structure and the second 3D structure are soft shell structures.

3. The system of claim 1, wherein the first 3D structure and the second 3D structure are rigid shell structures.

4. The system of claim 1, wherein:
the structural elements are rings; and
the set of joints are loosely-connected joints that allow adjacent rings multiple degrees of freedom of movement relative to one another.

5. The system of claim 4, wherein a diameter of a ring is adjustable to morph the first 3D structure into the second 3D structure.

6. The system of claim 4, wherein:
in an unstressed state, the circularly-packed network of rings forms a two-dimensional (2D) planar structure; and
in a stressed state, the circularly-packed network of rings forms at least one of the first 3D structure and the second 3D structure.

7. The system of claim 6, further comprising an inflatable structure underlying the circularly-packed network, the inflatable structure inflates and transitions the circularly-packed network from the unstressed state to the stressed state.

8. The system of claim 7, wherein the rings rest on and move relative to the inflatable structure.

9. The system of claim 1, wherein:
the structural elements are rigid disks; and
the set of joints are rigid joints that rigidly connect adjacent disks to one another.

10. The system of claim 1, wherein:
the structural elements are disks;
the set of joints are rigid joints that rigidly connect adjacent disks to one another;
in a first arrangement, the circularly-packed network comprises a first set of disks; and
in a second arrangement, the circularly-packed network comprises a second set of disks, wherein a diameter of at least a first disk of the first set differs from a diameter of at least a second disk in the second set.

11. A system, comprising:
a circularly-packed network of structural elements that form multiple three-dimensional (3D) structures, diameters of the structural elements define a shape of the 3D structures:
  in a first configuration, the circularly-packed network of structural elements forms a first 3D structure; and
  in a second configuration, the circularly-packed network of structural elements forms a second 3D structure having a different shape than the first 3D structure; and
a set of joints that connect adjacent structural elements.

12. The system of claim 11, wherein a diameter of at least a first structural element differs from a diameter of a second structural element.

13. The system of claim 11, wherein:
the structural elements are rings;
the set of joints are loosely-connected joints that allow adjacent rings multiple degrees of freedom of movement relative to one another; and
a diameter of a ring is adjustable to morph the first 3D structure into the second 3D structure.

14. The system of claim 13, further comprising an inflatable structure to morph the circularly-packed network from an unstressed state wherein the circularly-packed network forms a two-dimensional (2D) planar structure to a stressed state wherein the circularly-packed network forms at least one of the first 3D structure and the second 3D structure.

15. A method, comprising:
identifying a first three-dimensional (3D) structure for a circularly-packed network of structural elements, diameters of the structural elements define a shape of the first 3D structure;
identifying a second 3D structure for the circularly-packed network of structural elements, the second 3D structure having a different shape than the first 3D structure; and
changing a configuration of the circularly-packed network to morph the first 3D structure into the second 3D structure.

16. The method of claim 15, further comprising identifying diameter changes for the structural elements to morph the first 3D structure into the second 3D structure.

17. The method of claim 15, wherein:
the structural elements are loosely-connected rings; and
changing the configuration of the circularly-packed network to morph the first 3D structure into the second 3D structure comprises:
  setting the circularly-packed network to an unstressed state by deflating an inflatable structure underlying the circularly-packed network;
  adjusting a diameter of at least one ring; and
  setting the circularly-packed network to a stressed state by inflating the inflatable structure.

18. The method of claim 17, wherein changing the configuration of the circularly-packed network to morph the first 3D structure into the second 3D structure occurs without disassembling the circularly-packed network.

19. The method of claim 15, wherein:
the structural elements are rigidly-connected disks; and
changing a configuration of the circularly-packed network to morph the first 3D structure into the second 3D structure comprises exchanging at least a first rigidly-connected disk for a second rigidly-connected disk having a different diameter.

20. The method of claim 15:
further comprising:
  identifying, using conformal mapping, diameters for the structural elements to form the first 3D structure; and
  identifying, using conformal mapping, diameters for the structural elements to form the second 3D structure; and
wherein changing the configuration of the structural elements is based on identified diameters.

* * * * *